Figures 3, 4:
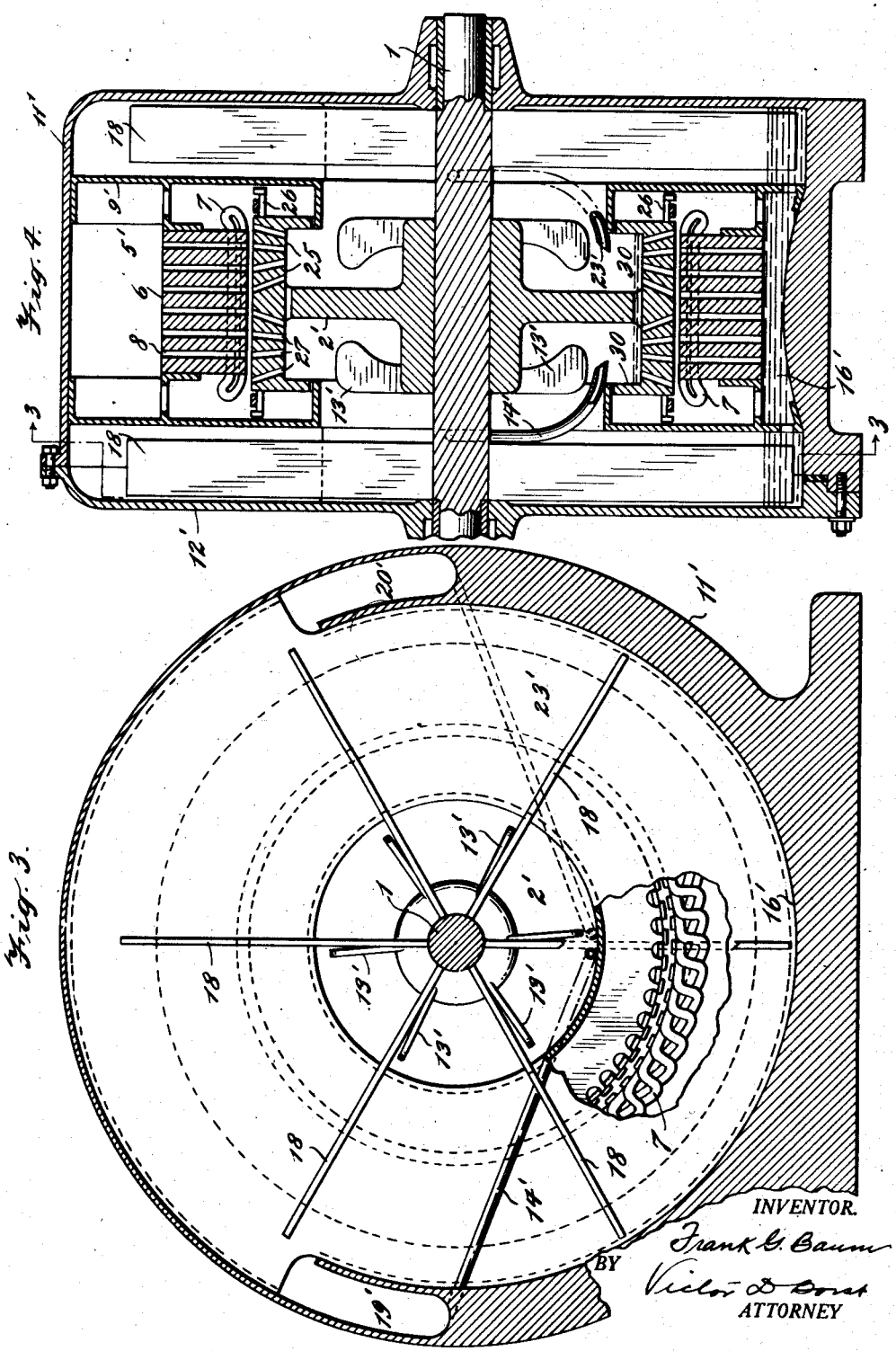

Nov. 13, 1928.
F. G. BAUM
1,691,696
DYNAMO COOLING SYSTEM
Filed Dec. 6, 1927   2 Sheets-Sheet 1
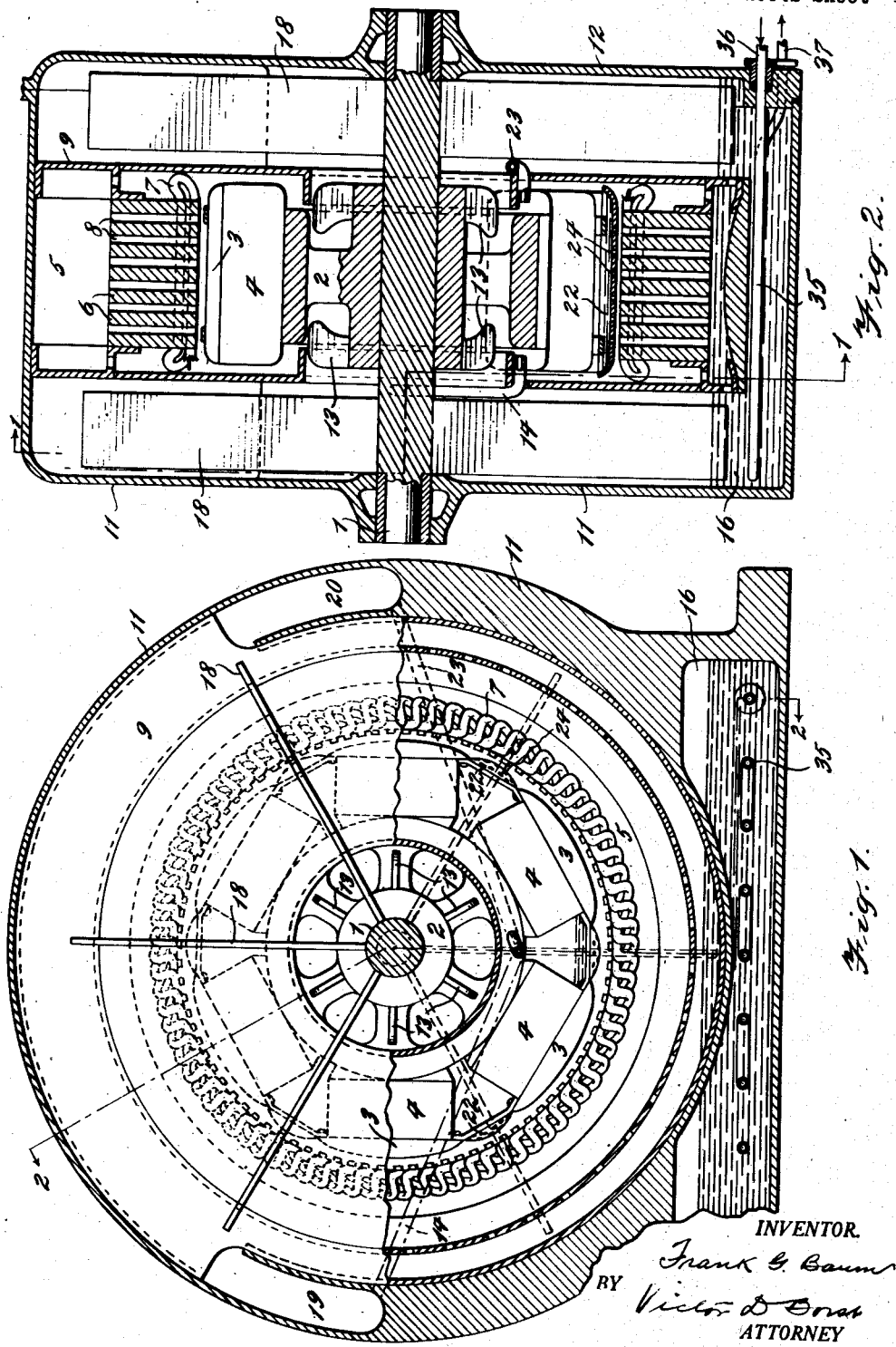
INVENTOR.
Frank G. Baum
BY
Victor D. Borst
ATTORNEY Nov. 13, 1928.

F. G. BAUM 1,691,696

DYNAMO COOLING SYSTEM

Filed Dec. 6, 1927     2 Sheets-Sheet 2

INVENTOR.
Frank G. Baum
BY
Victor D. Borst
ATTORNEY

Patented Nov. 13, 1928.

1,691,696

UNITED STATES PATENT OFFICE.

FRANK G. BAUM, OF SAN FRANCISCO, CALIFORNIA.

DYNAMO-COOLING SYSTEM.

Application filed December 6, 1927. Serial No. 238,019.

My invention relates to dynamo-electric machines comprising rotor and stator and to a method of cooling the same.

In the use of apparatus of the class mentioned there is always a development of heat, especially in the windings and cores of the stator and rotor, and as these heat units are being produced continuously during the operation of the machine, the rate at which such heat units can be disposed of determines its capacity, or in other words by providing means for increasing the rate at which rotor and stator part with their heat units, I am able to develop greater useful energy from the same apparatus, or equal energy from a smaller apparatus. This means a substantial and important increase in continuous rating of a dynamo-electric machine, and accordingly a greatly improved performance and a lower cost of production, from which follows a reduction in the cost of operation in the handling of electric energy.

Various devices and methods have been suggested for the cooling of such apparatus. In one form it has been proposed to circulate a cooling liquid, for instance, brine, through a system of pipes enclosed within the rotor and stator. Such devices, however, are complicated and bulky, expensive to operate and maintain, and are at any time likely to wreck the apparatus by reason of leakage of the cooling liquid from the pipes through which it is circulated.

In some cases it has been suggested to apply a stream or spray of water to the apparatus. This however cannot be done with an ordinary dynamo since the use of water would destroy the insulation within a very short time.

It has also been proposed to submerge the rotor and stator in oil contained in a housing, in which case there will be a prohibitive loss of energy through the churning of the oil by the rotating parts. In order to avoid such effect it has also been proposed to separate the rotor from the stator by a partition of non-magnetic material. Such a partition however prevents a circulation of oil from rotor to stator, and through the apparatus, and detracts from the cooling effect, and furthermore does not do away with losses due to churning or friction between rotor and liquid.

In my prior application Serial No. 192,202, filed May 18, 1927, I have disclosed and broadly claimed a dynamo electric machine in which oil or other suitable fluid having a high thermo-storage capacity is applied in finely divided condition to rotor and stator to absorb the heat and thereafter allowed to collect in a suitable receptacle, for use in a continuous manner. The present application relates to an improvement in devices of the character specified including novel means for the circulation of the cooling liquid.

Reference is hereby made to the accompanying drawing of which Fig. 1 is a transverse vertical section of a generator or dynamo constructed in accordance with my invention, the section being taken upon line 1—1 of Fig. 2. Fig. 2 is a section on line 2—2 of Fig. 1. Fig. 3 is a transverse vertical section of a dynamo or motor of another type embodying my invention, the section line being indicated as the line 3—3 of Fig. 4, and Fig. 4 is a central vertical section of the device of Fig. 3.

It is well known that oil has a very much higher specific heat than air, and that accordingly the cooling effect which can be obtained from it is much greater. For instance, oil has a weight of about 55 pounds per cubic foot, while air has a weight of about 0.08 pounds per cubic foot. The specific heat of oil is about 0.5, where that of air is about 0.237. The ratio of heat absorbing capacity of equal volumes of air and of oil is then given by the following equation:

$$\frac{55 \times 0.5}{.08 \times 0.237} \text{ or about 1450 times.}$$

Accordingly, for a given amount of cooling effect, a very much less volume of oil need be used than of air alone, and if a mixture of oil and air be used for cooling purposes, the volume of the mixture necessary for a given cooling effect is very much less than the volume of air alone, depending upon the ratio of oil to air in the mixture used. The oil is preferably applied in the form of a spray, or mist, or in relatively small drops, so that a minimum of churning effect is produced in the mixture by the movement of the rotor, and so that no single particle is sufficiently large to produce unduly large impact forces when it is thrown from the moving rotor to the stator.

To prevent loss of oil, the circulating medium should be enclosed. The dynamo-electric machine may be provided with closed end plates and frame with a reservoir at the bottom, so that as the oil spray strikes the stator it may drain down over the hot surfaces of the machine to the reservoir, after which it may be recirculated. The mixture of liquid and gas may consist of a fluid, such as oil, and air, or it may preferably consist of a less flammable mixture. For this purpose, it may consist of a mixture of oil spray and carbon-dioxide, with or without the inclusion of a small proportion of air, or it may consist of a mixture of oil and nitrogen, also with or without the inclusion of small quantities of air, insufficient to produce a combustible mixture with the oil.

One embodiment of the device of my invention is shown in Figs. 1 and 2. These figures show the essential parts of a typical dynamo-electric machine to which the improvement of my invention may be advantageously applied. The machine may consist of a shaft, 1, supported in bearings, to which is attached a rotor 2. The rotor may be a rotating field or a rotating armature, as desired. In the embodiment shown, it is indicated as a rotating field having salient poles 3, with appropriate field windings 4 thereon.

Between each pair of adjacent poles 3 is a pan or trough 22 the side edges of which are rigidly secured to the pole pieces. These pans being of heavy metal increase the rigidity of the rotor, and also cooperate in the circulation of the cooling medium as hereinafter described.

The rotor is surrounded by a stator 5, the core of which is of laminated construction, and is composed of a number of laminations placed in juxtaposition forming groups 6, separators (not shown) being placed between the various groups to form interspaces or passages 8 for the cooling medium and which extend entirely through the core in a radial or outward direction. Windings 7 are positioned in appropriate slots in the stator core. A suitable frame member 9 is provided for the support of the laminations forming the stator, and both stator and rotor are entirely enclosed by a housing formed of members 11 and 12 which fit closely about the bearings of shaft 1 and frame 9. The rotor also has fan blades 13 as shown for causing a circulation of the air or other gas contained in the housing 11, 12, of the machine.

The base of the housing 11, 12 is formed with a reservoir 16 which will contain a sufficient quantity of oil for carrying out the cooling method, and all of the oil which is applied to the heated parts for cooling purposes will by action of gravity find its way down into this reservoir through the various openings which are shown. Means are provided for a continuous circulation of oil from this reservoir which will now be described:

Upon each end of the rotor shaft 1 are mounted a plurality of arms, blades or vanes 18, the lower ends of which enter the reservoir 16 and remove liquid therefrom continuously during the operation of the device. The wall of the housing is formed with two tangential pockets, 19 and 20 respectively, which open directly into the space within the housing and in such position that the pocket 20 will receive oil from the vanes 18 in case the direction of rotation is clockwise Fig. 1, and the pocket 19 will receive the oil discharged by the vanes in case the direction of rotation is counter-clockwise. There is a pipe 14 which leads downwardly from the bottom of the pocket 19 to a point within the outer circumference of the rotor. This pipe occupies a space between one set of vanes 18 and the rotor and the lower end of the pipe is bent inward as shown so that as the oil flows from the pocket 19 down the pipe it will drop from the end thereof into one of the oil pans 22 of the rotor. There is a similar pipe 23 extending from the pocket 20, which pipe is positioned between the other set of vanes 18 and the rotor and its end is also bent inward so that the oil passing through the pipe will fall into one of the pans 22. The pans 22 are provided with perforations or openings 24 extending therethrough, and of such size as to provide a plurality of fine sprays of oil in the air gap between the rotor and stator. The size of these perforations may vary considerably as well as their number and they will ordinarily be so designed that the cooling oil which is received in the pan will not be entirely exhausted therefrom until the pan has substantially completed its rotation to bring it into position to receive a fresh supply of oil from the pipe 14 or 23.

Provision may be made for the passage through the rotor of currents of gas created by fan blades 13 and other moving parts of the rotor. Passages may be formed through the body of the salient poles 3 or preferably between the poles. Either construction provides currents of air or gas which mingle with the oil sprayed from the pans 22. The perforations 24 of the pans 22 may desirably be so placed as to provide a plurality of sprays of oil in radial alignment with the ventilating passages 8 in the stator.

The current of fluid from the pans 22 of the rotor is directed towards the inner surface of the stator in the bore thereof, and towards the inner openings of the ventilating passages therethrough. The greatly increased thermal capacity of this fluid, as compared to air alone, is thus available for the cooling both of the rotor member and the stator member. A portion of the oil may pass through the ventilating passages 8 in the stator core in the form of a spray and collect a substantial amount of heat therefrom, either by radiation or by convection. It is desirable that the spray pans 22 be so positioned that the openings 24 through which the oil is discharged and sprayed be located in the plane of the ventilating passages 8, in order to discharge as large a portion of the oil through the ventilating passages as possible, and to minimize the accumulation of oil within the air gap between the rotor and stator. While some of the oil spray is carried freely through the passages 8, other portions may strike the surfaces thereof, and coalesce thereon into a layer of liquid. This layer may be carried radially outward along the surfaces of the ventilating passages by the current of mixed air and oil spray. In its passage over these surfaces, the oil layer is advantageously related thereto for the desired cooling effect, and it is enabled to absorb a substantial amount of heat in the course of the flow. The oil is thus carried to the outer surface of the stator, through the ventilating passages, and it then flows downward to the reservoir 16 at the bottom of the housing.

In order to remove the heat from the oil in the reservoir 16 I provide a cooling coil 35 through which there is a continuous circulation of water by way of inlet 36, and outlet 37, any suitable circulatory means being provided.

The structure shown in Fig. 3 has been designed more particularly for units of small size, as for example motors used for a great variety of purposes, sometimes in position where they are exposed to unfavorable weather conditions, dampness, etc.

The structure shown resembles in a general way that of Figs. 1 and 2 in that there is a rotor 2' and two sets of radial arms, blades or vanes 18 mounted on shaft 1 and there is also a stator 5', and stator frame 9', all of which parts are enclosed within a housing formed by members 11' and 12'. The structure of the stator 5' and frame 9' is the same as that of stator 5 and frame 9, Figs. 1 and 2. The interior of the rotor is formed with a trough 30 for receiving oil from the pockets 19' and 20' through the pipes 14' and 23'. The rotor shown is of the well known squirrel cage type and consists of laminations 25 having peripheral slots in which are positioned the inductor bars 26 characteristic of this type of machine. The oil may be conducted through suitable channels 27 in the rotor body from the trough 30 to the rotor surface, at which point it may be sprayed by any appropriate means, which may consist of jet plugs or other spray devices positioned within and near the outer ends of the channels 27. The rotor has fan blades 13' which act similarly to blades 13 of Fig. 1. There is a reservoir 16' in the base of the housing 11', 12', of sufficient size to receive the oil used in cooling the machine, suitable openings being provided to enable the oil to descend thereto from all points. The ends of the passages 27 are desirably positioned in the plane of the ventilating passages 8 as previously described, and the oil spray together with a portion of gas as previously described is discharged into them for the production of a similar cooling effect upon the structures. The cooling oil flows over the warm surfaces collecting heat and thence descends into the reservoir at the base of the housing. In a high speed motor and to some extent in slower speed apparatus the vanes 18 act as beaters as well as oil conveying means and subdivide the oil to such extent as to create a fog of oil within the housing. By this construction very efficient cooling means are provided and much higher load capacity is obtainable from a given construction.

By the device of my invention it is possible to obtain very much more effective cooling of dynamo machinery, because of the much higher thermal capacity of the fluid employed for cooling. Because of the high thermal capacity of a given volume of the cooling fluid, it is thus possible to obtain equally effective cooling to that obtained by air, by the use of very much smaller ventilating ducts, or if the maximum size of ventilating ducts are employed it is possible to produce much more effective cooling. The device of my construction thus makes it possible to increase the duty on dynamo-electric machinery, thereby much reducing the cost of machinery for a given power out-put, since the additional parts required for the application of the device of my invention are very small items in the cost of the machinery. Thus a direct reduction of the cost of electric power is provided.

Further advantages of the device of my invention are found in the fact that the cooling system may be made completely closed, recirculating a given fluid as it is needed. Thus no external air need be supplied, and the conveyors and ducts which would be necessary for such supply, are saved. Likewise the elimination of the need for cooling air reduces the amount of dirt and moisture which would otherwise be carried into the machine by such circulating air. In consequence, the insulation condition of the machine is much improved, and the necessity for frequent cleaning to remove dirt and other obnoxious material is avoided. The presence of the oil directly adds to the insulation resistance, because of its own high insulation value and because of the elimination of moisture. Likewise the system makes it possible to enclose the machine in a non-combustible atmosphere, thereby greatly reducing the severity of any fires which may occur in the insulation due to overload, excess voltage, and other factors which tend to injure the insulation. Likewise in the event that fire occurs in the insulation, it is smothered at once upon the removal of load from the machine, by the cooling effect of the large quantities of oil thrown in, and by the lack of oxygen to support combustion.

The device of my invention is particularly applicable to relatively large dynamo machines, such as generators, rotary converters, and large motors. It is, however, equally well adapted to application to the smaller types of industrial motors, and is also applicable to railway and other transportation motors. In such service it is particularly advantageous because when so equipped, the motors are operating in a medium having a very high insulation resistance, as compared to operation under ordinary conditions where they are in a medium charged with moisture and other matter, tending towards a low insulation resistance.

Having now described my invention, what I claim is:

1. A dynamo-electric machine comprising a rotor, a stator, a housing enclosing the same, a reservoir within the housing, an arm secured to the rotor and extending into the reservoir, a stationary pocket having an opening in position to receive liquid thrown by said arm, and a conduit for permitting the flow of liquid from said pocket to the interior of the rotor.

2. A dynamo-electric machine comprising a rotor, a stator, a housing enclosing the same and having an interior pocket, a reservoir within the housing, and means for circulating liquid by centrifugal action from the reservoir to the pocket of the housing, by gravity from said pocket to the interior of the rotor, by centrifugal action from the rotor, and by gravity back to the reservoir.

3. A dynamo-electric machine comprising a rotor, a stator, a housing enclosing the same, a reservoir, an arm secured to the rotor and extending into the reservoir, a stationary pocket to receive liquid thrown by said arm when rotating in one direction, and another stationary pocket to receive liquid thrown by said arm when rotating in the opposite direction.

4. A dynamo-electric machine comprising a rotor, a stator, a housing enclosing the same, a reservoir within the housing, an arm secured to the rotor and extending into the reservoir and a stationary pocket having an opening in position to receive liquid thrown by said arm.

5. A dynamo-electric machine comprising a rotor, a stator, a housing enclosing the same, a reservoir within the housing, an arm secured to the rotor and extending into the reservoir and a stationary pocket integral with said housing and having an opening in position to receive liquid thrown by said arm.

6. A dynamo-electric machine comprising a rotor, a stator, a housing enclosing the same, a reservoir within the housing, an arm secured to the rotor and extending into the reservoir and a stationary pocket arranged tangentially with respect to the path of the extremity of said arm and having an opening in position to receive liquid thrown by said arm.

7. A dynamo-electric machine comprising a rotor, a stator, a housing enclosing the same, a reservoir for cooling liquid, an arm secured to the rotor and extending into the reservoir, said arm being spaced from the rotor, a stationary pocket to receive liquid thrown by said arm and a conduit for the flow of liquid from said pocket to the rotor, said conduit occupying the space between said arm and said rotor.

8. A dynamo-electric machine comprising a rotor, a stator, a housing enclosing the same, a reservoir within the housing, an arm secured to the rotor and extending into the reservoir, a stationary pocket having an opening in position to receive liquid thrown by such arm, a conduit extending downward from said pocket and toward the rotor shaft, the lower end of said conduit being bent inward and extending across the plane of rotation of one end of said rotor.

9. A dynamo-electric machine comprising a rotor, a stator, a housing enclosing the same, a reservoir, an arm secured to the rotor and extending into the reservoir, and a stationary pocket to receive liquid thrown by said arm when rotating in one direction, and another stationary pocket to receive liquid thrown by said arm when rotating in the opposite direction, a conduit for flow of liquid from one of said pockets to the interior of said rotor and a conduit for flow of liquid from the other pocket to the interior of the rotor, said conduits being at opposite ends of the rotor.

10. A dynamo-electric machine comprising a rotor, a stator, a housing enclosing the same, a reservoir for cooling liquid, arms secured to the rotor at either end thereof and spaced therefrom, stationary pockets to receive liquid thrown by said arms when rotating in either direction, and a conduit for the flow of liquid from each of said pockets to the rotor, said conduits respectively occupying the two spaces between the ends of the rotor and said arms.

11. In a dynamo-electric machine, a rotor member and a stator member, a housing enclosing the same, a reservoir for cooling liquid, a stationary pocket, a conduit extending from said pocket to the interior of the rotor, means operating by centrifugal force for continuously removing liquid from the reservoir and supplying it to said pocket, and means for permitting the flow of said liquid through said rotor in an outward direction.

12. In a dynamo-electric machine, a rotor member and a stator member, a housing enclosing the same, a reservoir for cooling liquid, a stationary pocket, a conduit extending from said pocket to the interior of the rotor, means operating by centrifugal force for continuously removing liquid from the reservoir and supplying it to said pocket, and means for permitting the flow of said liquid through said stator in an outward direction.

13. In a dynamo-electric machine, a rotor member and a stator member, a housing enclosing the same, a reservoir for cooling liquid, a stationary pocket, a conduit extending from said pocket to the interior of the rotor, means operating by centrifugal force for continuously removing liquid from the reservoir and supplying it to said pocket, and means for permitting the flow of said liquid through said rotor and stator in an outward direction.

In witness whereof, I hereunto subscribe my signature.

FRANK G. BAUM.